(12) United States Patent
Creighton

(10) Patent No.: US 9,120,491 B2
(45) Date of Patent: Sep. 1, 2015

(54) SYSTEM AND METHOD FOR ACCUMULATION OF AIR FOR PNEUMATIC RAILROAD CAR SYSTEMS

(75) Inventor: George S. Creighton, Double oak, TX (US)

(73) Assignee: Trinity Industries, Inc., Dallas, TX (US)

( * ) Notice: Subject to any disclaimer, the term of this patent is extended or adjusted under 35 U.S.C. 154(b) by 871 days.

(21) Appl. No.: 12/866,865

(22) PCT Filed: Feb. 2, 2009

(86) PCT No.: PCT/US2009/032789
§ 371 (c)(1),
(2), (4) Date: Aug. 9, 2010

(87) PCT Pub. No.: WO2009/099980
PCT Pub. Date: Aug. 13, 2009

(65) Prior Publication Data
US 2011/0006592 A1 Jan. 13, 2011

Related U.S. Application Data

(60) Provisional application No. 61/026,965, filed on Feb. 7, 2008.

(51) Int. Cl.
*B60T 13/00* (2006.01)
*B61D 7/02* (2006.01)
(Continued)

(52) U.S. Cl.
CPC . *B61D 7/02* (2013.01); *B60T 15/48* (2013.01); *B61D 7/28* (2013.01); *B60T 13/268* (2013.01); *B60T 13/365* (2013.01); *B60T 15/302* (2013.01)

(58) Field of Classification Search
CPC ..... B60T 13/26; B60T 13/266; B60T 13/268; B60T 13/36; B60T 13/365; B60T 13/385; B60T 13/70; B60T 15/021; B60T 15/302; B60T 17/06
USPC ............... 303/6.1, 7, 9.66, 127, 128, 157, 80, 303/DIG. 1, DIG. 2; 188/151 R, 152, 352; 105/286
See application file for complete search history.

(56) References Cited

U.S. PATENT DOCUMENTS 2,101,708 A * 12/1937 Goodknight .................... 303/80
2,196,977 A   4/1940 Campbell et al. ................. 291/3
(Continued)

FOREIGN PATENT DOCUMENTS

FR        837330     11/1938 .......................... 3/4
WO  WO 2005/021349   3/2005  ............... B61D 7/02

OTHER PUBLICATIONS

"Air Brake Valve Input-Output Characteristic Requirements"; 2009 SAE International, Jan. 2007.
(Continued)

*Primary Examiner* — Melody Burch
(74) *Attorney, Agent, or Firm* — Baker Botts L.L.P.

(57) ABSTRACT

Systems and methods for accumulating air in an auxiliary reservoir of a railroad car are disclosed. In some embodiments, the method may include charging an air brake system. Air pressure in the air brake system may reach a predetermined value. Once this predetermined value is reached, additional or excess air may be bled from the air brake system and the additional or excess air may accumulate in an auxiliary reservoir. The auxiliary reservoir may be adapted to supply air to an auxiliary cylinder or other types of pneumatic components or equipment.

22 Claims, 4 Drawing Sheets

(51) Int. Cl.
*B60T 15/48* (2006.01)
*B61D 7/28* (2006.01)
*B60T 8/66* (2006.01)
*B60T 13/36* (2006.01)
*B60T 13/26* (2006.01)
*B60T 15/30* (2006.01)

(56) References Cited

U.S. PATENT DOCUMENTS

| | | | | |
|---|---|---|---|---|
| 2,279,158 A | | 4/1942 | Campbell | 291/5 |
| 2,846,273 A | * | 8/1958 | Sexton et al. | 303/66 |
| 2,930,658 A | | 3/1960 | George | 303/8 |
| 2,953,127 A | * | 9/1960 | Adams et al. | 123/179.31 |
| 3,228,730 A | | 1/1966 | Schubert | 303/7 |
| 3,480,337 A | * | 11/1969 | Cook | 303/72 |
| 3,574,413 A | | 4/1971 | Euga | 303/7 |
| 3,584,214 A | * | 6/1971 | Peterson | 303/135 |
| 3,601,451 A | | 8/1971 | Cummins et al. | 303/13 |
| 4,052,109 A | * | 10/1977 | Nagase et al. | 303/25 |
| 4,128,276 A | | 12/1978 | Beck et al. | 303/13 |
| 4,280,596 A | * | 7/1981 | Miller | 188/52 |
| 4,284,011 A | * | 8/1981 | Eagle | 105/310 |
| 4,344,656 A | | 8/1982 | Masterson, Jr. et al. | 303/2 |
| 4,673,222 A | * | 6/1987 | Knight | 303/9 |
| 4,758,052 A | | 7/1988 | Bechman et al. | 303/9 |
| 5,549,363 A | * | 8/1996 | Kanjo et al. | 303/7 |
| 5,598,872 A | * | 2/1997 | Kasugai et al. | 137/854 |
| 6,036,282 A | * | 3/2000 | Clarke et al. | 303/7 |
| 6,286,913 B1 | | 9/2001 | Mazur et al. | 303/15 |
| 2003/0146661 A1 | | 8/2003 | Hatch | 303/119.3 |

OTHER PUBLICATIONS

Chinese Office Action with English Translation; Application No. 200980112317.1; pp. 12, Oct. 19, 2012.
Second Chinese Office Action with English Translation; Application No. 200980112317.1; pp. 7, Sep. 29, 2013.
Third Chinese Office Action with English Translation; Application No. 200980112317.1; pp. 7, May 6, 2014.

* cited by examiner

SYSTEM AND METHOD FOR ACCUMULATION OF AIR FOR PNEUMATIC RAILROAD CAR SYSTEMS

RELATED APPLICATION

This application claims the benefit of PCT/US2009/032789, entitled System and Method for Accumulation of Air for Pneumatic Railroad Car Systems, filed Feb. 2, 2009. PCT/US2009/032789 claims the benefit of U.S. Provisional Application Ser. No. 61/026,965 filed Feb. 7, 2008, entitled System and Method for Accumulation of Air for Pneumatic Railroad Car Systems, which is hereby incorporated by reference.

TECHNICAL FIELD

The present disclosure relates generally to air powered systems on railroad cars, and more particularly to the accumulation of air in an auxiliary reservoir.

BACKGROUND

Railway cars or railroad cars with one or more hoppers have been used for many years to transport and sometimes store dry, bulk commodities and materials. Hopper cars are frequently used to transport coal, sand, metal ores, ballast, aggregates, grain and any other type of lading which may be satisfactorily discharged through respective openings formed in one or more hoppers. Respective discharge openings are often provided at or near the bottom of each hopper to rapidly discharge cargo. A variety of door assemblies and gate assemblies along with various operating mechanisms have been used to open and close discharge openings associated with railway cars.

Hopper cars may be classified as open or closed. Hopper cars may have relatively short sidewalls and end walls or relatively tall or high sidewalls and end walls. The sidewalls and end walls of many hopper cars are typically reinforced with a plurality of vertical side stakes. The sidewalls and end walls are typically formed from steel or aluminum sheets. Some hopper cars include interior frame structures or braces to provide additional support for the sidewalls. Some hopper cars may be generally described as top loading and bottom unloading. Such hopper cars typically require closing gates or doors located underneath the hopper car prior to loading and opening the gates or doors only when the hopper car is at a specific location in an unloading facility. Through use of linkages and one or more power sources such as an air cylinder, a hydraulic cylinder, an electrical motor, capstan drive system or other types of operating mechanisms associated with hopper cars, the gates or doors may be closed prior to loading and opened to discharge lading.

Railroad cars or railway cars often use pneumatic systems to operate various components and/or to carry out various functions associated with each railroad car or railway car. In particular, the brakes of a railroad car may be actuated when an air pressure signal from an associated locomotive is received by the respective brake system. A dedicated train line extending from an associated locomotive may supply air for charging the respective brake system of each railroad car attached to the associated locomotive and may allow transmission of an air pressure signal that directs the brake cylinder of each railroad car to actuate.

Other components of a railroad car may also be air powered similar to pneumatic systems that operate the brakes. For example, pneumatic systems (sometimes referred to as "auxiliary systems") may be used to lower and raise a ramp for surface loading vehicles. Pneumatic systems may also be used to open and close discharge doors, hatches, or other doors on a railroad car. Such pneumatic systems often require a separate train line that runs the length of the train to supply respective air reservoirs to operate respective pneumatic systems or components associated with corresponding railroad cars.

SUMMARY

In accordance with teachings of the present disclosure, air may be accumulated in one or more auxiliary reservoirs or air reservoirs associated with a railroad car while charging a respective air brake system associated with the railroad car. Air pressure in the respective air brake system may be allowed to reach a predetermined value prior to supplying air to one or more associated air reservoirs or auxiliary reservoirs. Once the predetermined value of air pressure in the respective brake system is reached, a portion of the air flowing through an associated air brake line (sometimes referred to as "excess air") may be bled from the respective air brake system. Such air from the respective air brake system may be accumulated in one or more auxiliary reservoirs without compromising performance of the respective air brake safety system. Each auxiliary reservoir may be adapted to supply air to an auxiliary cylinder or other types of pneumatic equipment or components on the associated railroad car.

A particular embodiment of the present disclosure may include bleeding air from an emergency brake reservoir. Another embodiment of the present disclosure may include bleeding air from an air brake system through a port in a control valve that is one component of the air brake system.

Technical advantages of particular embodiments may include operating a discharge door control system using one or more pneumatic components without requiring a separate dedicated train line or a wayside air supply to provide operating air to the pneumatic components or components. Operating discharge door control systems independently of a separate, dedicated train line in accordance with teachings of the present disclosure may allow an associated railroad car to be placed in a train with any mix of railroad cars and still provide satisfactory control of associated discharge doors.

Further technical advantages of particular embodiments may include accumulating air in an auxiliary reservoir once a predetermined pressure exists in an associated brake system. This may prevent delays in moving a train that might otherwise be associated with time required to charge one or more auxiliary reservoirs prior to reaching an initial full operating pressure or satisfactory operating pressure required for the associated brake system.

Still further technical advantages of particular embodiments may include charging an auxiliary system or pneumatic system using an existing port on a control valve that controls air flow to and from a brake system of an associated railroad car.

Pneumatic systems requiring a dedicated train line may be expensive. Such pneumatic systems may also require that all cars in the train have the same dedicated train line equipment to transmit air from the locomotive to each car along the train. Thus, a railroad car with pneumatic systems or components that require a dedicated train line to operate one or more pneumatic systems or pneumatic components may generally only be used in trains where all of the cars are equipped to accommodate the dedicated train line. In lieu of a separate dedicated train line, prior methods to supplying air to respective pneumatic systems may include respective wayside air supplies for each railroad car when the train is located as an appropriate track side facility. Teachings of the present disclosure allow railroad cars with respective pneumatic systems and/or pneumatic components to be included in a train which does not include a dedicated train line to supply air to such pneumatic systems and/or components and does not require wayside air supplies to satisfactory operate such pneumatic systems and/or components.

For some embodiments railroad cars associated with moving iron ore from taconite mines or moving ore from other mining facilities may include one or more auxiliary reservoirs operable to supply air to operate pneumatic components associated with such railroad cars. Private railroads (sometimes referred to as "short lines") may be used to move ore from a mine to an associated ore processing facility. Such facilities often do not have wayside air supplies.

Other technical advantages will be readily apparent to one of ordinary skill in the art from the following figures, descriptions, and claims. Moreover, while some specific advantages have been enumerated above, various embodiments may include all, some, or none of the enumerated advantages.

BRIEF DESCRIPTION OF THE DRAWINGS

A more complete understanding of embodiments of the disclosure will be apparent from the detailed description taken in conjunction with the accompanying drawings in which.

DETAILED DESCRIPTION

Figure 1:
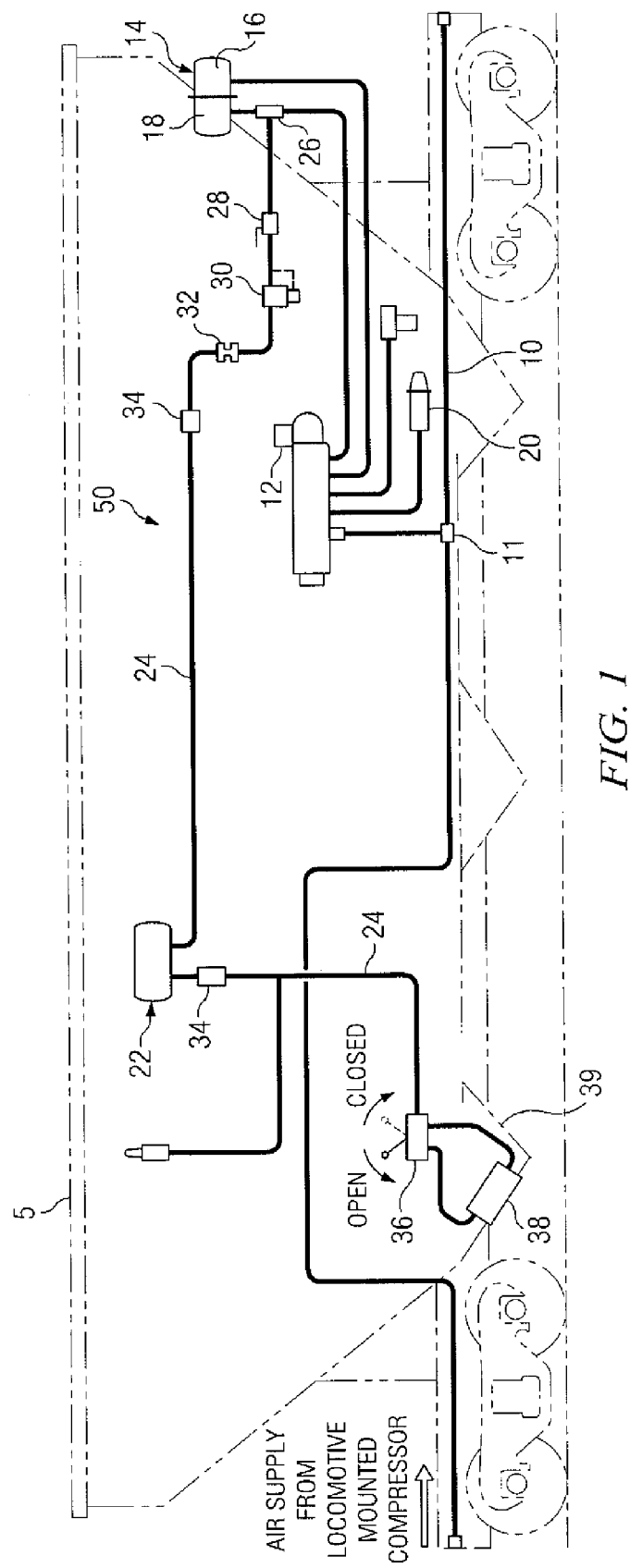
FIG. 1 illustrates a schematic diagram of a pneumatic system which may be used to operate brakes and discharge doors of an associated railroad car in accordance with an embodiment of the present disclosure.
Figure 2:
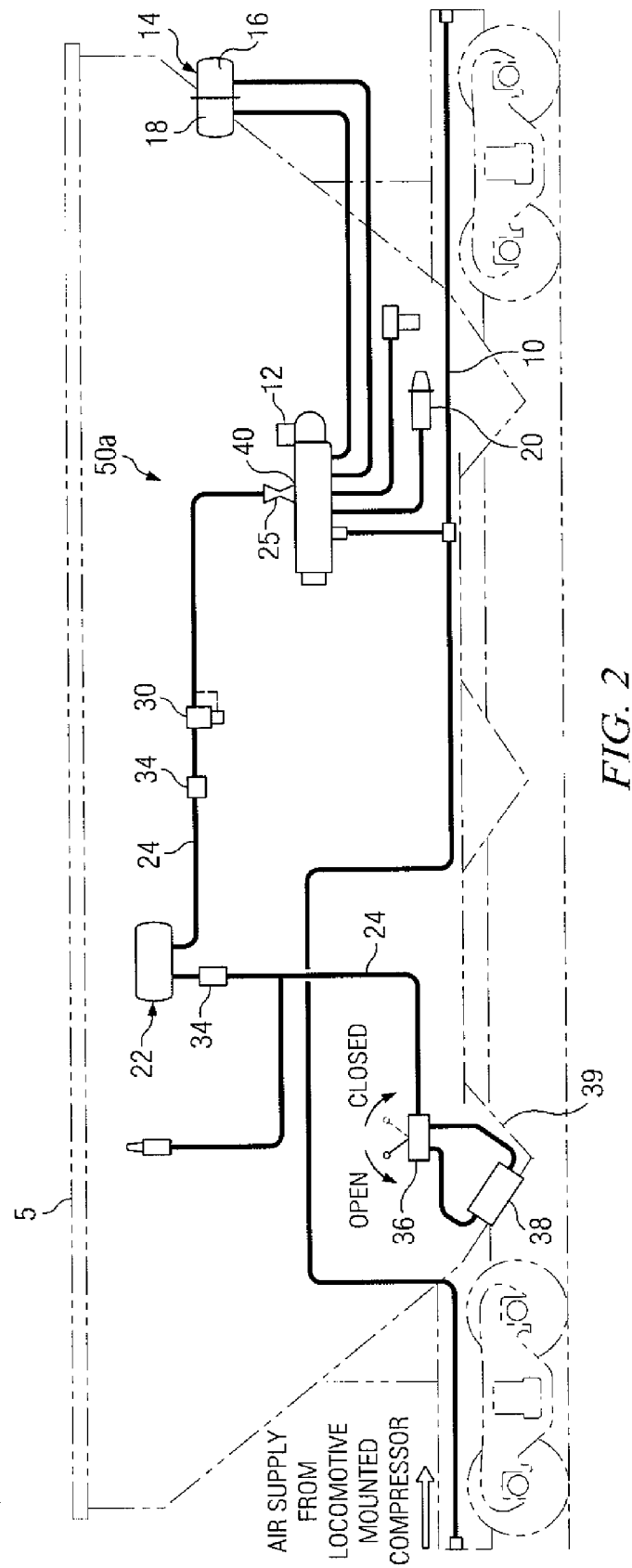
FIG. 2 illustrates a schematic diagram of a pneumatic system which may be used to operate brakes and discharge doors of an associated railroad car by supplying air to operate the discharge doors from a port disposed in a control valve associated with the brake system in accordance with an embodiment of the present disclosure.
Figure 3:
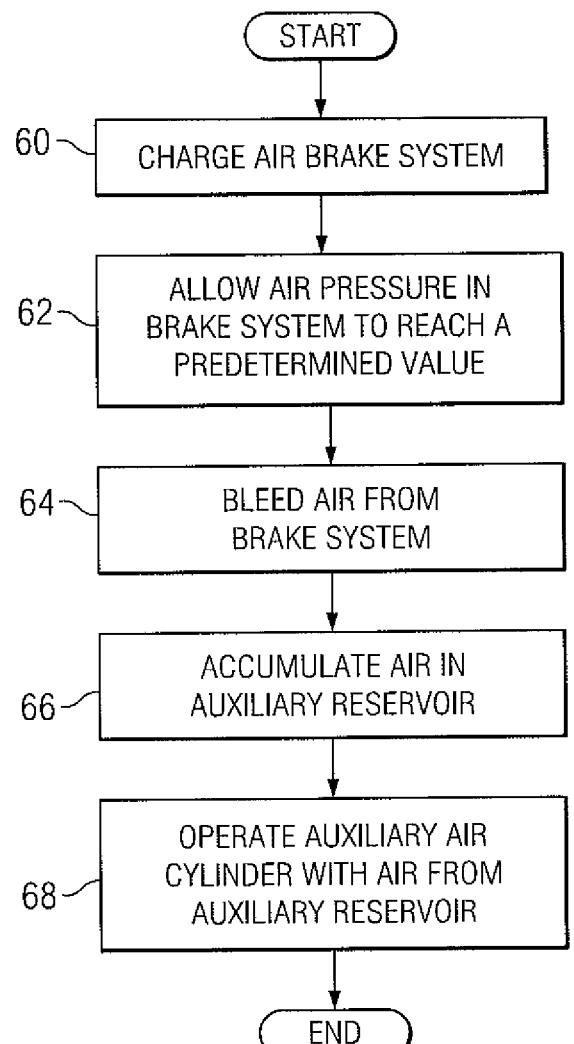
FIG. 3 illustrates a flow diagram of one method to accumulate air in an auxiliary reservoir in accordance with a particular embodiment of the present disclosure.

Various embodiments and their advantages may be understood by referring to FIGS. 1 through 3 of the drawings.

Pneumatic systems and/or auxiliary systems incorporating teachings of the present disclosure may be satisfactorily used with a wide variety of railroad cars or railway cars including, but not limited to, hopper cars, covered or closed hopper cars, open hopper cars, coal cars, ore cars and ballast cars. Various features of the present disclosure may be satisfactorily used with closed or covered hopper cars and open hopper cars that carry aggregate, ore, iron ore, grain, plastic pellets and other types of bulk lading. Various teachings of the present disclosure may be satisfactorily used with ballast cars (not expressly shown). Examples of lading carried by covered or closed hopper cars may include, but are not limited to, corn distillers dried grains (DDG), corn condensed distillers solubles (CDS), corn distillers dried grains/solubles (DDGS) and wet distillers grain with solubles (WDGS). Such products may be associated with ethanol production from corn and/or other types of grain.

Teachings of the present disclosure may be satisfactorily used with railroad cars or railway cars having a wide variety of discharge control systems, discharge openings, door assemblies or gates. The present disclosure may be used with railway cars having longitudinal discharge openings, longitudinal door assemblies, lateral discharge openings, and/or lateral door assemblies. Air cylinders and various types of air motor drive systems may be used to operate associated discharge control systems.

Railroad car 5 as shown in FIGS. 1 and 2 may be generally described as an open hopper car with bottom discharge openings or outlets. Respective door assemblies or gates may be opened and closed to control discharge of lading from discharge openings or outlets associated with railroad car 5. However, the present disclosure is not limited to open hopper cars with bottom discharge openings. The present disclosure is not limited to any type of railroad car, any type of pneumatic system or component and/or any type of lading.

FIG. 1 is a schematic representation of a pneumatic system of associative with railroad car 5. The pneumatic system may be used to operate air brakes (not expressly shown) and discharge doors 39 in accordance with one embodiment of the present disclosure. The illustrated embodiment incorporates a conventional railroad car air brake system 50 with auxiliary air reservoir 22 that may be used to supply air to operate one or more air powered systems or pneumatic systems associated with railroad cars. For example, auxiliary air reservoir 22 may supply air to operate discharge doors 39 of railroad car 5.

Air used to operate the brakes on railroad cars may be transmitted through brake pipe 10 to control valve 12 and may accumulate in brake reservoir 14. Brake line 10 may be coupled with corresponding brake lines in attached railroad cars (not expressly shown) to form a train line or brake air train line operable to communicate air from an associated locomotive (not expressly shown) to each railroad car attached to the locomotive as part of a train.

Figure 4:
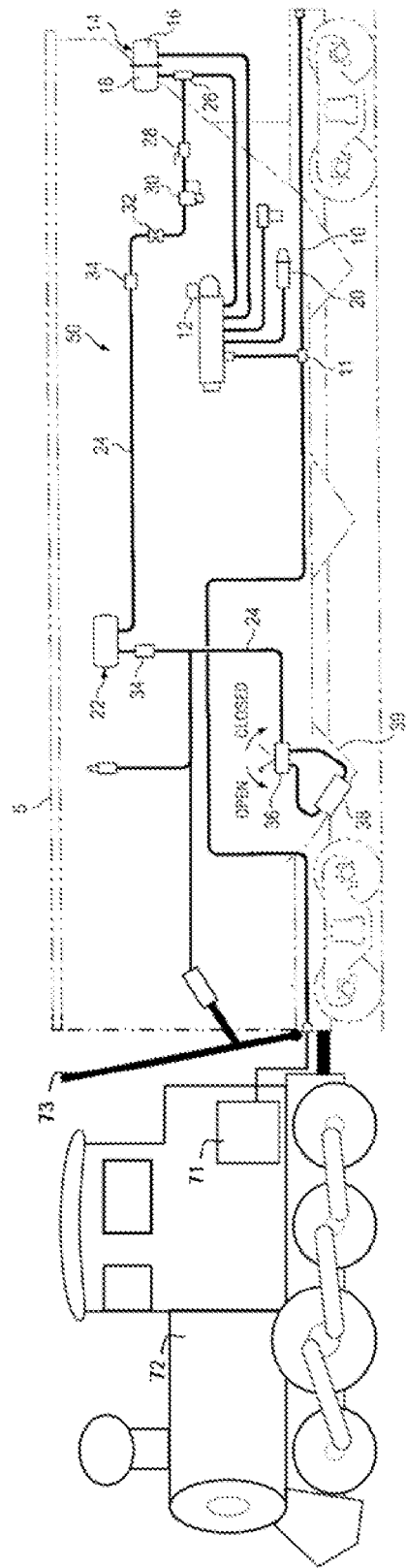
FIG. 4 illustrates a schematic diagram of a railroad car engaged with a locomotive in accordance with one or more embodiments of the present disclosure.

Brake reservoir 14 may include service reservoir 16 and emergency reservoir 18. A compressor 71 located on an associated locomotive 72 may cause air to be transmitted through the associated train line including brake pipe 10, as illustrated in FIG. 4. Air from brake pipe 10 may enter air brake system 50 of railroad cars through branch pipe tee 11 and ultimately accumulate in brake reservoir 14.

Brake pipe 10 may be a part of the brake train line that extends the length of an associated train and runs through all railroad cars of the train. Brake pipe 10 may serve at least two purposes. First, air travels through brake pipe 10 to accumulate in brake reservoir 14 for each individual railroad car. Second, brake pipe 10 facilitates transmission of a pressure drop that activates respective brakes associated with each railroad car.

When a locomotive engineer "applies the brakes," a pressure drop or sudden reduction in air pressure typically occurs in brake line 10. This reduction or drop in air pressure is transmitted through each brake pipe 10 along the entire length of the train. The drop in air pressure provides a signal for respective control valve 12 on each railroad car to release high pressure air from service brake reservoir 16 to brake cylinder 20 which activates the associated brakes of each railroad car. Brake cylinder 20 may be mounted on a car body or may be mounted on railway trucks of the associated railroad car.

Emergency brakes of a railroad car generally operate similarly to the service brakes. When an engineer determines that emergency brakes are necessary, a pressure reduction signal is sent through brake pipe 10 to control valve 12. Because of the severe pressure drop when applying emergency brakes, each control valve 12 senses that air from emergency reservoir 18 is needed to transmit to associated brake cylinder 20 to apply emergency braking force to stop the respective railroad car.

In accordance with a particular embodiment, air from emergency reservoir 18 may be allowed to accumulate in auxiliary reservoir 22. Air from auxiliary reservoir 22 may be used to operate other air powered systems or pneumatic components of an associated railroad car. Air may accumulate in auxiliary reservoir 22 while sufficient air pressure in emergency reservoir 18 is maintained such that the emergency brakes will be operational if needed.

Air may pass from emergency reservoir 18 through air pipe 24 to reach auxiliary reservoir 22. Air pipe 24 may be a ⅜ths inch diameter pipe. The air may travel from emergency reservoir 18 through branch pipe tee 26 and then through cutout cock 28. Air may then move through pressure protection valve 30.

Along air pipe 24, restrictor orifice 32 may be positioned to ensure that no more than a certain flow rate of air is allowed to leave emergency reservoir 18. Restrictor orifice 32 may be 1/32nd of an inch in diameter. The Manual of Standards and Recommended Practices published by The Association of American Railroads (AAR) may govern the size of restrictor orifice 32. The Manual may include regulations that govern removing air from emergency reservoir 18 to use to supply air-operated devices. In addition to restrictor orifice 32, check valve 34 may be a rubber seated check valve that is operable to prevent airflow from returning back to emergency reservoir 18 from the auxiliary device and the auxiliary reservoir 22. Check valve 34 may be configured in accordance with standards of recommended practices discussed above with respect to restrictor orifice 32.

Some embodiments of the present disclosure may incorporate pressure protection valve 30. Pressure protection valve 30 may be a device that senses a pressure differential between atmospheric pressure and a source pressure. The source pressure acting on pressure protection valve 30 in the embodiment illustrated in FIG. 1, may be pressure from emergency reservoir 18. Once the differential pressure reaches a predetermined value, pressure protection valve 30 will open and allow air to pass through. If the pressure differential between emergency reservoir 18 and the atmosphere drops below the predetermined value, no air will be allowed to pass through pressure protection valve 30.

Thus, pressure protection valve 30 may be set at a value that only allows air to pass through pressure protection valve 30 to auxiliary reservoir 22 if there is sufficient air in emergency reservoir 18 to accommodate emergency operations of the associated brake system. In this manner, pressure protection valve 30 may allow relatively slow accumulation of air from associated emergency reservoir 18 into auxiliary reservoir 22. Thus, air may be transmitted through pressure protection valve 30 when normal operation of an associated locomotive's compressor or other factors cause air pressure in emergency reservoir 18 to exceed a predetermined value. The predetermined value may be selected such that emergency reservoir 18 remains satisfactorily charged with air to operate the emergency brakes and still allow a small quantity of air to gradually bleed or flow from emergency reservoir 18 to accumulate in auxiliary reservoir 22. In certain embodiments, it may take forty-five (45) minutes to fully charge auxiliary reservoir 22 once pressure protection valve 30 opens for the first time.

Pressure protection valve 30 will allow a railroad car's air brake system to be fully charged before any air is allowed to pass to auxiliary reservoir 22. Without pressure protection valve 30, auxiliary reservoir 22 may have to be fully charged before an engineer has proper air pressure in the air brake system to allow moving an associated train. Having to fully charge auxiliary reservoir 22 may cause an increase in the time required to charge railroad car's brake system to an initial operating pressure that must be reached at initial terminal test points. This initial operating pressure ensures that the railroad car's brakes will operate should they be needed before the compressor located on the locomotive has fully charged the air brake system during normal operation. The emergency reservoir 18 is often the last system to charge on a conventional railroad car.

Air from auxiliary reservoir 22 may be used for a variety of air powered applications on an associated railroad car. For example, air from auxiliary reservoir 22 may be used to lower and raise a ramp 73 for surface loading vehicles, as illustrated in FIG. 4. It may also be used to open discharge doors 39 or other doors on the railroad car. Hatches may also be opened and closed with air from auxiliary reservoir 22. Embodiments of the present disclosure are not limited to the uses listed, but rather any pneumatic system or pneumatically powered component of a railroad car that may use air as a source of power may employ auxiliary reservoir 22 as its air source.

In particular embodiments of the present disclosure, air from auxiliary reservoir 22 may be used to operate discharge doors 39 of railroad car 5. Such operation, may be accomplished by an air system that allows air to travel from auxiliary reservoir 22 in air pipe 24 through check valve 34 to reach door valve 36. Door valve 36 may be a three-position operating door valve that allows air to flow through it to reach door cylinder 38 and either open or close discharge doors 39 of railroad cars.

Operating discharge doors 39 of railroad car 5 from air accumulated in auxiliary reservoir 22 in accordance with an embodiment of the present disclosure may eliminate the need for a separate train line that might otherwise be required to run the length of the train in order to power the individual door cylinders on each individual railroad car. Air accumulated in auxiliary reservoir 22, in accordance with particular embodiments of the present disclosure, may also eliminate the need for wayside air service to operate discharge doors 39 if there is no separate train line.

In addition, a railroad car in accordance with embodiments of the present disclosure may be used in a train without a dedicated train line separate from brake pipe 10 because auxiliary reservoir 22 may allow discharge doors 39 to be operated independent of a separate train line. This may eliminate the need for a train line to extend the full length of the train. For a train line to operate each door system in each car, it must be allowed to extend the full length of the train. In contrast, in accordance with particular embodiments of the present disclosure, a train line may be made to extend a certain length of the train, and still include a car with auxiliary reservoir 22 beyond the end of the dedicated train line with fully operational pneumatic discharge doors 39.

Particular embodiments of the present disclosure may allow a railroad car to be placed in any mix of cars and be transported in any train to a destination while still providing the ability to actuate the car's discharge doors 39 at the destination. Once at the destination, a railroad car in accordance with a particular embodiment of the present disclosure also may be unloaded without being connected to a wayside air supply, which is the current alternative to a dedicated train line for providing air for the operation of discharge doors 39.

A further embodiment of the present disclosure is illustrated in FIG. 2. FIG. 2 illustrates a schematic representation of air brake system 50a in accordance with a particular embodiment of the present disclosure. FIG. 2 illustrates the conventional air brake system of FIG. 1 along with auxiliary reservoir 22. Auxiliary reservoir 22 may be supplied by the air running from brake pipe 10 through control valve 12. Control valve 12 may include port 40 (often referred to as "Port Number 11") from which air may flow to auxiliary reservoir 22 for operation of air powered systems of the railroad car. Many control valves associated with air brake systems on railroad cars include "Port Number 11". Air from control valve 12 may flow through choke 25 and into air pipe 24 to reach auxiliary reservoir 22. Choke 25 may be disposed inside port 40 and may restrict rate of air accumulation in auxiliary reservoir 22. Air pipe 24 may also include a pressure protection valve which functions as described with respect to the embodiment illustrated in FIG. 1.

Air pipe 24 may also have along its length check valve 34 to prevent backflow to control valve 12 from auxiliary reservoir 22. Once auxiliary reservoir 22 is charged by the compressor located on an associated locomotive, auxiliary reservoir 22 may be used to operate a cylinder by the use of an operating valve. For example, door valve 36 may be used to actuate door cylinder 38 in the open and closed directions.

The port 40 may include a fitting (not expressly shown) designed into the casting that forms the service portion of control valve 12. The port 40 may be isolated in control valve 12 so there is no adverse effects on the performance of air brake system 50a in the railroad car when port 40 is tapped to allow air to accumulate in auxiliary reservoir 22.

Port 40 (Port Number 11) may have been included in existing control valve castings to be used in special applications that may require an auxiliary braking system. An auxiliary braking system may be necessary for a particular railroad car that may have six axles instead of the more common railroad car with only four axles. In the instance of the six-axle railroad car, the auxiliary brake system may include an additional brake cylinder. The AAR Manual of Standards and Recommended Practices may govern the use of Port Number 11 to allow air to be taken from the primary brake system to supply an auxiliary brake cylinder. An embodiment of the disclosure incorporating port 40 may allow similar advantages to those discussed with respect to the embodiment which draws air from emergency reservoir 18.

Various components of air brake systems 50 and 50a are commercially available from New York Air Brake Corporation (located in Watertown, N.Y.), a member of the Knorr-Bremse Group of companies and from Wabtec Corporation located in Wilmerding, Pa. Pressure protection valve 30 and other valves which meet applicable U.S. Department of Transportation requirements are available from several companies such as, but not limited to, Alkon Corporation in Fremont, Ohio.

FIG. 3 is a flowchart illustrating one method for accumulating air in an auxiliary reservoir which may be used to operate an auxiliary cylinder in accordance with a particular embodiment of the present disclosure. The method begins at step 60 where the air brake system of a railroad car is charged. Charging the brake system may be accomplished using an air compressor of an associated locomotive. The brake system may continue to charge as the train runs, provided there is no call for braking. The air brake system may be charged to a point that meets the requirements for an initial terminal test before the train is allowed to begin operation. The initial terminal test may ensure that the air brake system will be operational even though it may not be fully charged.

Air pressure in the brake system may be allowed to reach a predetermined value at step 62. The predetermined value may be seventy-five pounds per square inch (psi). The predetermined value may be a value that is determined by comparing the atmospheric pressure to the pressure of the brake system. In certain embodiments, the pressure in emergency reservoir 18 may be allowed to reach a predetermined value. Pressure protection valve 30 may be incorporated into air pipe 24 to ensure that the predetermined value is reached before air is allowed to travel through pressure protection valve 30 and accumulate in auxiliary reservoir 22.

Once the predetermined value is reached, air from brake reservoir 14 and/or emergency reservoir 18 may be allowed to bleed through pressure protection valve 30 at step 64. In other embodiments, air may be allowed to bleed through port 40 to accumulate in auxiliary reservoir 22. Bleeding of air from emergency reservoir 18 or through port 40 may continue over a period of time during the operation of the train. Air may bleed periodically through pressure protection valve 30 for approximately forty-five minutes before auxiliary reservoir 22 is fully charged.

At step 66, air may accumulate in auxiliary reservoir 22. Air accumulating in auxiliary reservoir 22 may be prevented from back flowing into emergency reservoir 18 by check valve 34. Air may continue to accumulate in auxiliary reservoir 22 as the train continues to move.

Air from auxiliary reservoir 22 may be used to operate an auxiliary cylinder at step 68. An example auxiliary cylinder may be door cylinder 38. The auxiliary cylinder may be any air operated cylinder capable of operating any device on a railroad car that can be operated using air power. Door cylinder 38 may be controlled using door valve 36 which can control air flow into door cylinder 38 to open and close discharge doors 39 of railroad car 5.

Some of the steps illustrated in FIG. 3 may be combined, modified, or deleted where appropriate, and additional steps may also be added to the flowchart. Additionally, steps may be performed in any suitable order without departing from the scope of the disclosure.

Although the present disclosure has been described in detail with reference to particular embodiments, it should be understood that various other changes, substitutions, and alterations may be made hereto without departing from the spirit and scope of the present disclosure. For example, all of the elements included in embodiments of the air accumulation system and method for operating an auxiliary cylinder, may be combined, rearranged, or positioned in order to accommodate particular manufacturing or operational needs.

Numerous other changes, substitutions, variations, alterations, and modifications may be ascertained by those skilled in the art as intended that the present disclosure encompass all such changes, substitutions, variations, alterations, and modifications as falling within the spirit and scope of the appended claims.

What is claimed is:

1. A method for accumulating air in an auxiliary reservoir of a railroad car, comprising:
   charging an air brake system, the air brake system comprising a brake reservoir, a brake cylinder, and a control valve configured to release air from the brake reservoir directly to the brake cylinder, such that the brake reservoir is in direct fluid communication with the brake cylinder through the control valve, in response to receiving a braking signal;
   bleeding air directly from the brake reservoir to the auxiliary reservoir through a port in the control valve when air pressure in the brake reservoir increases to a predetermined value, the air bled directly from the brake reservoir to the auxiliary reservoir being air that has not travelled to the brake cylinder before reaching the auxiliary reservoir after being accumulated in the brake reservoir; and accumulating the air bled directly from the brake reservoir in the auxiliary reservoir through the control valve, the auxiliary reservoir configured to supply the air from the air brake system to an auxiliary component, the bleeding air from the brake reservoir through the port in the control valve occurring during normal operation.

2. The method of claim 1, wherein supplying the air to an auxiliary component further comprises:

supplying the air to an auxiliary cylinder; and operating a discharge door by actuating the auxiliary cylinder using the supplied air.

3. The method of claim 1, further comprising charging the air brake system by a compressor disposed on a locomotive coupled with the railroad car.

4. The method of claim 1, wherein bleeding air from the brake reservoir further comprises bleeding the air from an emergency brake reservoir through the control valve, the brake reservoir comprising the emergency brake reservoir.

5. The method of claim 1, wherein bleeding air from the brake reservoir when the air pressure in the brake reservoir increases to the predetermined value comprises bleeding the air when a pressure differential between the air pressure in the brake reservoir and atmospheric pressure reaches the predetermined value.

6. The method of claim 5, further comprising bleeding the air when the predetermined value is 500 kPa (75 p.s.i.).

7. The method of claim 1, wherein the port in the control valve is a Port Number 11 as specified in the Association of American Railroads Manual of Standards and Recommended Practices.

8. The method of claim 1, wherein supplying the air to an auxiliary component further comprises:

supplying the air from the auxiliary reservoir to an auxiliary cylinder; and operating a loading ramp by actuating the auxiliary cylinder.

9. A system for accumulating air in an auxiliary reservoir of a railroad car, comprising:

an air brake system configured to be coupled to the railroad car, the air brake system comprising a control valve, a brake reservoir, and a brake cylinder, the control valve configured to release air from the brake reservoir directly to the brake cylinder, such that the brake reservoir is in direct fluid communication with the brake cylinder through the control valve, in response to receiving a braking signal;

an auxiliary reservoir coupled to the brake reservoir through the control valve, the auxiliary reservoir configured to supply air pressure to actuate an auxiliary cylinder; and a pressure protection valve configured to allow air to bleed directly from the brake reservoir to the auxiliary reservoir through a port in the control valve during normal operation when air pressure in the brake reservoir increases to a predetermined value, the air bled directly from the brake reservoir to the auxiliary reservoir being air that has not travelled to the brake cylinder before reaching the auxiliary reservoir after being accumulated in the brake reservoir, and the auxiliary reservoir configured to accumulate the air bled directly from the brake reservoir through the control valve.

10. The system of claim 9, wherein the brake reservoir is provided to supply air used to actuate emergency brakes of the railroad car.

11. The system of claim 9, further comprising a check valve operable to prevent a backflow of air from the auxiliary reservoir to the brake system.

12. The system of claim 9, wherein the pressure protection valve is adapted to bleed air from the brake reservoir when a pressure differential between the air pressure in the brake reservoir and associated atmospheric pressure increases to the predetermined value.

13. A system for accumulating air in an auxiliary reservoir to be associated with an auxiliary system of a railroad car, comprising:

an air brake system configured to be coupled to a railroad car, the air brake system comprising a control valve, a brake reservoir configured to accumulate air therein, and a brake cylinder configured to activate a braking process for the railroad car in response to receiving air from the brake reservoir, the control valve comprising a port that forms a service portion of the control valve, and the control valve configured to release the air from the brake reservoir directly to the brake cylinder, such that the brake reservoir is in direct fluid communication with the brake cylinder through the control valve, in response to receiving a braking signal;

an auxiliary reservoir coupled to the port of the control valve, the auxiliary reservoir configured to supply an actuation air pressure to actuate an auxiliary cylinder; and a pressure protection valve configured to allow air to bleed directly from the brake reservoir to the auxiliary reservoir through the port in the control valve during normal operation, the air bled directly from the brake reservoir to the auxiliary reservoir being air that has not travelled to the brake cylinder before reaching the auxiliary reservoir after being accumulated in the brake reservoir, and the port of the control valve is coupled with the auxiliary reservoir such that the auxiliary reservoir is configured to accumulate the air bled directly from the brake reservoir through the control valve.

14. The system of claim 9, further comprising a discharge door operated by actuation of the auxiliary cylinder.

15. The system of claim 13, further comprising the pressure protection valve adapted to allow the accumulation of air in the auxiliary reservoir by bleeding the air from the brake reservoir when air pressure in the brake reservoir increases to a predetermined value.

16. The system of claim 13, further comprising a choke operable to restrict rate of accumulation of air in the auxiliary reservoir.

17. The system of claim 13, wherein the port is isolated in the control valve.

18. The system of claim 13, further comprising a valve operable to bleed air from the air brake system when a pressure differential between the air pressure in the brake reservoir and atmospheric pressure increases to the predetermined value.

19. The system of claim 9, wherein the predetermined value is approximately 500 kPa (75 p.s.i.).

20. A system according to claim 9 in combination with a railroad car.

21. The system of claim 20 wherein the railroad car is selected from the group consisting of hopper cars, grain cars, ore cars, iron ore cars, cars operable to carry taconite, closed hopper cars, or open hopper cars.

22. The system of claim 9, wherein the auxiliary cylinder is an auxiliary component separate from the brake cylinder.

* * * * *